United States Patent [19]

Yoshida et al.

[11] Patent Number: 4,876,714
[45] Date of Patent: Oct. 24, 1989

[54] TELEPHONE SET

[75] Inventors: Shigeyuki Yoshida; Atsushi Musha; Takayuki Nonami, all of Hyogo, Japan

[73] Assignee: Mitsubishi Denki Kabushiki Kaisha, Tokyo, Japan

[21] Appl. No.: 4,085

[22] Filed: Jan. 15, 1987

[30] Foreign Application Priority Data

Jan. 30, 1986 [JP] Japan .................... 61-13442

[51] Int. Cl.⁴ .................................. H04M 1/19
[52] U.S. Cl. ............................. 379/433; D14/249
[58] Field of Search ............... 379/428, 433, 437, 440, 379/434, 435, 436; D14/52, 53, 57, 59, 63, 67, 64, 248, 249

[56] References Cited

U.S. PATENT DOCUMENTS

| | | | |
|---|---|---|---|
| D. 266,763 | 11/1982 | Grae | D14/64 |
| D. 272,146 | 1/1984 | Mo | D14/53 |
| D. 273,490 | 4/1984 | Chen | D14/63 |
| D. 276,723 | 12/1984 | Marshall | D14/64 |
| D. 282,166 | 1/1986 | Yuen | D14/53 |
| D. 282,738 | 2/1986 | Nichols | D14/53 |
| D. 285,557 | 9/1986 | Bocko | D14/57 |
| D. 289,896 | 5/1987 | Martensson et al. | D14/53 |
| 2,490,637 | 12/1949 | Kraepelien | 379/433 X |
| 2,643,301 | 4/1949 | Cornfeld | 379/433 |
| 3,521,008 | 3/1967 | Tyson | 379/435 |
| 4,178,488 | 12/1979 | Nishihata | 379/432 |
| 4,319,095 | 3/1982 | Cogan | 379/433 |
| 4,334,321 | 6/1982 | Edelman | 379/433 X |
| 4,720,857 | 1/1988 | Burris et al. | 379/430 |

FOREIGN PATENT DOCUMENTS

| | | |
|---|---|---|
| 656723 | 8/1951 | United Kingdom . |
| 988859 | 4/1965 | United Kingdom . |
| 1116070 | 6/1968 | United Kingdom . |
| 1212389 | 11/1970 | United Kingdom . |
| 2087686 | 5/1982 | United Kingdom . |

OTHER PUBLICATIONS

Telephony, Oct. 15, 1910, Handset with Transmitter Cover.

Primary Examiner—Jin F. Ng
Assistant Examiner—Randall S. Vaas
Attorney, Agent, or Firm—Wolf, Greenfield & Sacks

[57] ABSTRACT

A telephone set and a handset are provided which are capable for preventing acoustic coupling between a telephone transmitter and a telephone receiver by isolating the transmitter from the region of the receiver.

7 Claims, 3 Drawing Sheets

Fig. 3 (PRIOR ART)
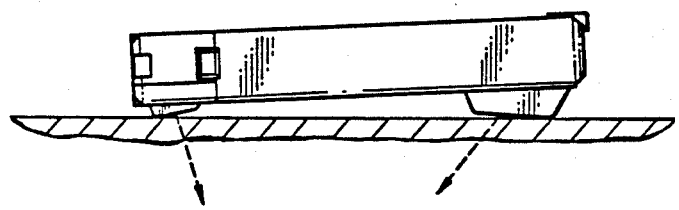
Fig. 4
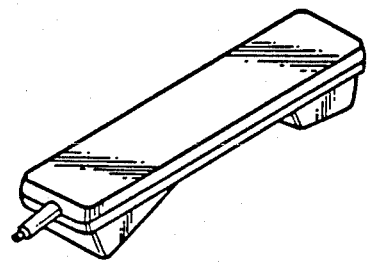
Fig. 5a (PRIOR ART)    Fig. 5c (PRIOR ART)
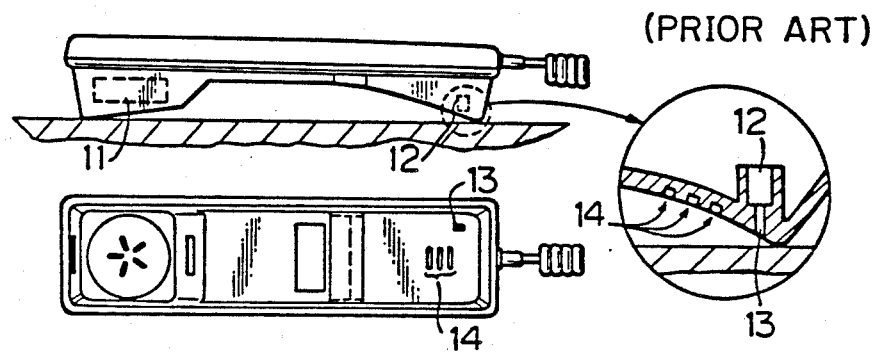
Fig. 5b (PRIOR ART)

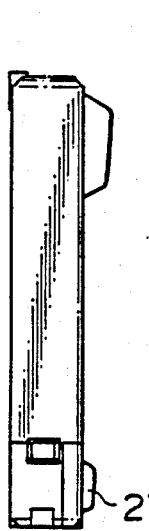 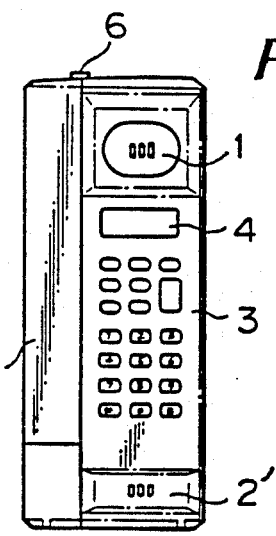
Fig. 6a  Fig. 6b
Fig. 7
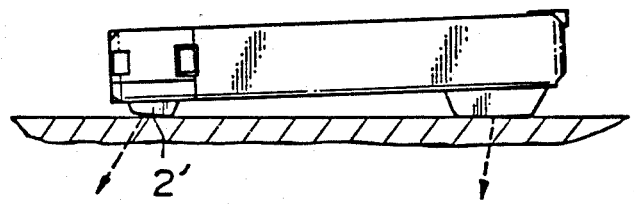
Fig. 8a  Fig. 8c
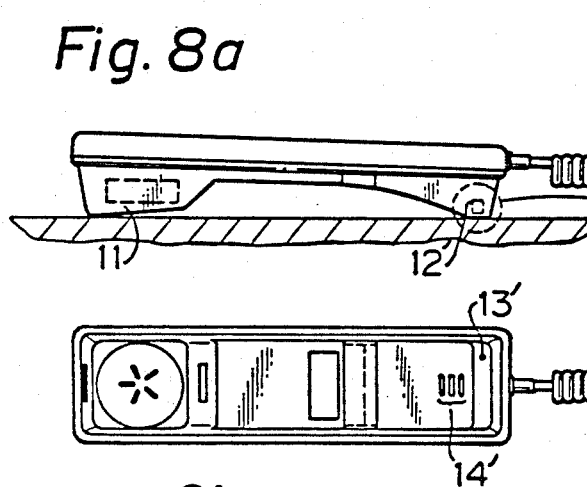 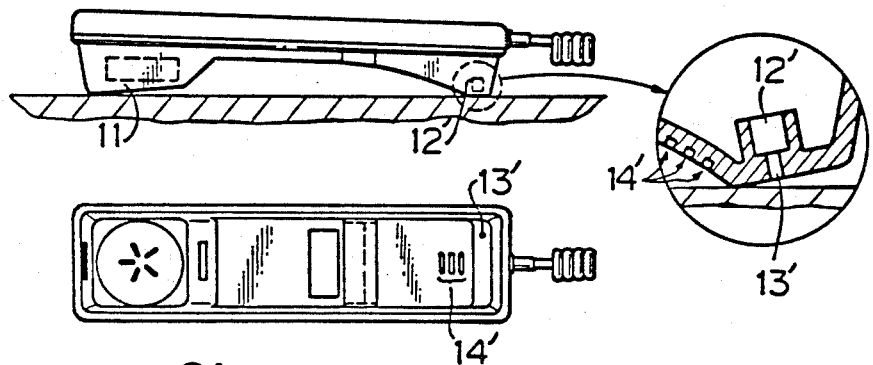
Fig. 8b

TELEPHONE SET

BACKGROUND OF THE INVENTION

1. Field of the Invention

The present invention relates to a telephone set which is used by being connected to a telephone line.

2. Description of the Prior Art

FIG. 1 and FIG. 2 are respectively a perspective view and a plan view showing a telephone set according to the prior art. In the drawings, reference numeral 1 designates a telephone receiver, numeral 2 designates a telephone transmitter, numeral 3 designates push button switches, numeral 4 designates an indicator, numeral 5 designates a battery pack removably attached to the telephone body and numeral 6 designates an antenna stored in the telephone body.

Operation of the above-mentioned telephone set will now be explained. When the telescopic antenna 6 is fully pulled up, a desired telephone number is entered (keyed-in) by use of the push button switches 3, and a calling button is pressed, the telephone will be available for communication with the party being called. After that, communication can be conducted in the same manner as a conventional telephone. After the communication is over and a termination button is depressed, the telephone is initialized and ready for receiving another call. When the telephone is placed with the receiver and transmitter facing upwardly, no substantial problems will occur. However, when the telephone is placed on a horizontal plane during communication with the receiver and transmitter facing downwardly, as shown in FIG. 3, openings provided in the receiver and the transmitter face the same surface, and the signals being emitted from the receiver (such as sounds during communication) may be directed toward the transmitter, resulting in acoustic coupling.

Since the telephone set according to the prior art is constituted in this way, when the telephone is placed on a horizontal plane during communication with the transmitter and receiver facing downwardly, as shown in FIG. 3, openings or apertures provided at the respective positions of the transmitter and receiver face the same surface resulting in acoustic coupling between the transmitter and the receiver. When such acoustic coupling becomes substantial, it may appear as an echo distortion on the telephone line and thus the transmission performance or speech quality may be adversely affected.

FIG. 4 is a perspective view showing a handset which includes a transmitter and a receiver but which does not include operating buttons such as dial buttons, that is, the associated telephone set body includes such buttons and the handset is connected to the telephone set body with a cable. FIGS. 5(a) and (b) are a side elevation and a bottom view, respectively of the handset shown in FIG. 4 wherein numeral 11 denotes a receiver, numeral 12 denotes a transmitter, numeral 13 denotes an opening for the transmitter, and numeral 14 denotes slits which are provided for ornamental purposes and do not penetrate the housing of the handset. There are problems similar to those mentioned above in the handset of the type shown in FIGS. 4 and 5 also.

SUMMARY OF THE INVENTION

In view of the foregoing problems in the prior art, it is an object of the invention to provide a telephone set and handset having a structure capable of reducing the amount of acoustic coupling which occurs between the telephone transmitter and the telephone receiver even if the telephone set and handset are placed horizontally during a telephone conversation. This prevents the speech quality being adversely affected by the problem of acoustic coupling outlined above.

In accordance with the invention, a telephone set (handset) is provided which is constructed such that when the telephone (handset) is placed on a horizontal plane with the transmitter and receiver facing downwardly, the plane in which openings for the transmitter are provided is parallel to the plane on which the telephone (handset) is place, or the transmitter faces the direction which is substantially reverse to that of the receiver.

In accordance with the invention, since the transmitter is disposed as above explained, the telephone set (handset) is capable of reducing the incidence of acoustic coupling between the receiver and the transmitter.

BRIEF DESCRIPTION OF THE DRAWINGS

The foregoing features and other aspects of the invention are explained in the following detailed description taken in connection with the accompanying drawings wherein:

FIG. 3 is a side elevation showing the telephone set of the prior art placed in a horizontal position;

FIG. 4 is a perspective view showing a handset which is separate from the associated telephone set body;

FIGS. 5(a) and 5(c) are a side elevation, and 5(b) is a bottom view, with a partially enlarged cross-sectional view of the handset shown in FIG. 4;

FIG. 6B is a front view and FIG. 6A is a side elevation of the telephone set according to an embodiment of the invention;

FIG. 7 is a side elevation showing the telephone set of the invention which is placed in a horizontal position; and FIGS. 8(a) and 8(c) are a side elevation, and FIG. 8(b) is a bottom view, with a partially enlarged cross-sectional view of the handset according to another embodiment of the invention.

DESCRIPTION OF THE PREFERRED EMBODIMENTS

Figure 1:
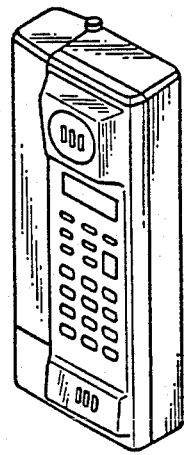
FIG. 1 is a perspective view showing a telephone set of the prior art.
Figure 2A:
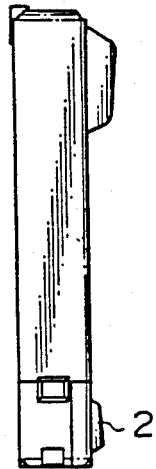
FIG. 2B is a front view and FIG. 2A is a side elevation of the telephone set shown in FIG. 1.
Figure 2B:
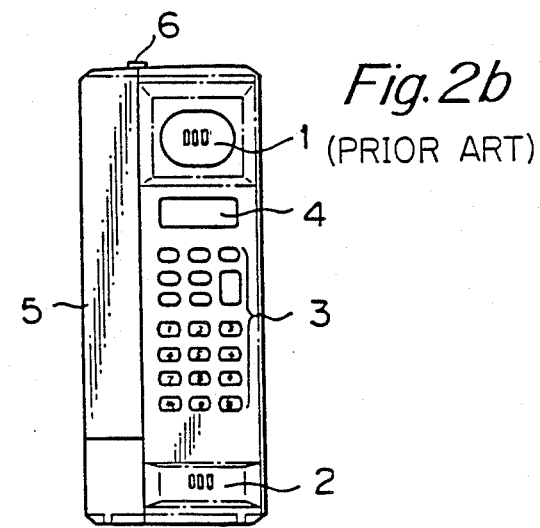

Referring now to FIG. 6, there is shown an embodiment of a telephone set according to the invention. In FIG. 6, reference numeral 1 designates a telephone receiver, numeral 2' designates a telephone transmitter according to the invention, numeral 3 designates push button switches, numeral 4 designates an indicator, numeral 5 designates a battery pack removably attached to the telephone body and numeral 6 designates an antenna (shown as stored in the telephone body).

Operation of the present telephone set will next be explained. After the telescopic antenna is fully pulled up, a desired telephone number is entered (keyed-in) and a calling button is pressed, the telephone will be ready for communication with the opposite party. After that, communication can be conducted in the same manner as with a conventional telephone. When the conversation is over and a termination button is depressed, the telephone is set in intialized condition and is ready for another call. Even if the telephone is placed on a horizontal plane with the receiver and the transmitter facing downwardly during communication, the plane in which an opening or apertures for the receiver are provided is placed in parallel with the plane on which the telephone is placed, as shown in FIG. 7, or alternatively the opening of the transmitter faces the direction which is reverse to that of the receiver. Thus the incidence of acoustic coupling between the receiver and the transmitter may be reduced, so that the signals from the receiver (such as sounds during communication) may not be directed toward the transmitter and acoustic coupling is thereby prevented.

The present invention may also be applied to a handset of a type such as that shown in FIGS. 4 and 5. FIG. 8 is a side elevation and bottom view of the handset according to another embodiment of the invention. As shown, an opening 13' for a transmitter 12' is disposed to face in the same direction as, and parallel to, the radiation axis of a receiver 11, or alternatively to face in the direction which is reverse to that of such axis, whereby the same effect can be attained as is achieved in the above-mentioned embodiment (FIGS. 6 and 7). Also, ornamental slits 14' are provided as shown.

As explained above, according to the present invention, the transmitter is so configured that when the telephone (or handset) is placed on a horizontal plane with the transmitter and receiver facing downwardly, the plane of the transmitter opening or apertures is parallel to the plane on which the telephone is placed, or alternatively the transmitter faces in the direction which is substantially reverse to that of the receiver. Since, therefore, the opening of the transmitter is isolated from that of the receiver, any acoustic coupling occurring between the transmitter and the receiver can be reduced without providing a special additional circuit, even during communication. In this way, the advantage of protecting the telephone against the risk of speech quality being adversely affected can be obtained.

Having described preferred embodiments of the invention, it will be apparent to those skilled in the art that many changes and modifications may be made without departing from the concepts of the invention.

We claim:

1. In a telephone handset having a transmitter for generating sound, a receiver for receiving sound, and a handset housing incorporating said transmitter and said receiver substantially on said first side and at respective transmitter and receiver handset housing sections, the improvement wherein said handset housing is generally oblong in shape, having a first and a second end and said transmitter is mounted at said first end and said receiver is mounted at said second end and said transmitter and said receiver are positioned in said housing so that when said telephone set is placed on a flat surface with said transmitter and said receiver facing said flat surface, a sound-impervious portion of said housing contacts said surface at a contact line formed between said transmitter and said receiver, said contact line extending substantially orthogonal to a line joining the transmitter and receiver and substantially across the width of said housing both said transmitter and receiver housing sections comprising acoustic-coupling aperture means respectively subscribing an aperture means coupling area, said sound impervious contact line extending a length across the width of said housing that is greater than both said respective aperture means coupling areas whereby said housing acts as a sound baffle at the contact line and sound generated by said transmitter and reflected from said surface cannot directly enter said receiver, both said transmitter and receiver handset housing sections having a housing section wall extending along a predetermined plane and having defined therein said acoustic-coupling aperture means for the coupling of acoustic signals along a predetermined axis that is substantially orthogonal to said predetermined plane, said transmitter and receiver housing section walls being formed so that at least one of said aperture means predetermined axes extends in a direction out of normal to said flat surface, said aperture means predetermined axes extending in a direction away from said handset housing and diverging therefrom whereby acoustic signals radiated from said transmitter are, in addition to being baffled by said sound-impervious portion, directed away from said receiver.

2. In a telephone handset, the improvement according to claim 1 wherein one of said aperture means predetermined axes extends normal to said flat surface and the other of said aperture means predetermined axes extends out of the normal to said flat surface.

3. In a telephone handset, the improvement according to claim 1 wherein said handset further has a maximum width at one of said transmitter and receiver handset housing sections and the contact line extends across this maximum width.

4. In a telephone handset, the improvement according to claim 1 wherein said aperture means predetermined axis that extends out of normal is the transmitter aperture means predetermiend axis.

5. In a telephone handset, the improvement according to claim 1 wherein said aperture means each include a series of apertures.

6. In a telephone handset, the improvement according to claim 1 wherein both said transmitter and receiver aperture means predetermined axes extend in a direction out of normal to said flat surface.

7. In a telephone handset, the improvement according to claim 1 wherein said transmitter aperture means predetermined axis is out of normal to said flat surface and said sound-impervious portion is integral with said transmitter handset housing section.

* * * * *